(12) United States Patent
Bushey et al.

(10) Patent No.: US 7,049,508 B2
(45) Date of Patent: May 23, 2006

(54) FLEXIBLE CONDUIT

(76) Inventors: Richard D. Bushey, 1596 38th Ave., Kenosha, WI (US) 53144; Bret L. Bushey, 5535 Sandhill Rd., Caledonia, WI (US) 53402

( * ) Notice: Subject to any disclaimer, the term of this patent is extended or adjusted under 35 U.S.C. 154(b) by 0 days.

(21) Appl. No.: 11/110,516

(22) Filed: Apr. 20, 2005

(65) Prior Publication Data

US 2005/0236172 A1    Oct. 27, 2005

Related U.S. Application Data

(60) Provisional application No. 60/564,093, filed on Apr. 21, 2004.

(51) Int. Cl.
*H02G 3/04* (2006.01)
(52) U.S. Cl. ............... 174/48; 174/68.1; 174/68.3; 52/220.1; 52/220.7
(58) Field of Classification Search .......... 174/48, 174/49, 60, 67, 68.3, 95, 99 R, 68.1, 72 R, 174/97, 96, 135; 220/3.2, 3.3, 3.8, 3.5; 385/134, 385/135; 52/220.1, 220.3, 220.7, 220.8; 439/207, 208, 215, 216
See application file for complete search history.

(56) References Cited

U.S. PATENT DOCUMENTS

| | | | | | |
|---|---|---|---|---|---|
| 3,761,603 | A | * | 9/1973 | Hays et al. | 174/72 A |
| 4,463,046 | A | * | 7/1984 | Hutchison et al. | 428/217 |
| 5,814,767 | A | * | 9/1998 | Katz | 174/68.1 |
| 6,380,484 | B1 | * | 4/2002 | Theis et al. | 174/68.3 |
| 6,476,323 | B1 | * | 11/2002 | Beebe et al. | 174/68.3 |

* cited by examiner

*Primary Examiner*—Angel R. Estrada
(74) *Attorney, Agent, or Firm*—Boyle Fredrickson Newholm Stein & Gratz S.C.

(57) ABSTRACT

A flexible conduit that forms a raceway for cables and wires is provided. The flexible conduit includes a generally flat strip extending along an axis and a first plurality of hinges in the strip. Each of the first plurality of hinges is generally parallel to the axis such that the strip is foldable along the first plurality of hinges between a first open configuration and a second closed configuration wherein the strip of material defines the raceway. A second plurality of hinges, spaced along the axis, is also provided in the strip. Each hinge of the second plurality of hinges extends along a corresponding hinge axis generally perpendicular to the axis of the strip such that the strip is foldable along the second plurality of hinges between the first open configuration and a second folded configuration.

21 Claims, 3 Drawing Sheets

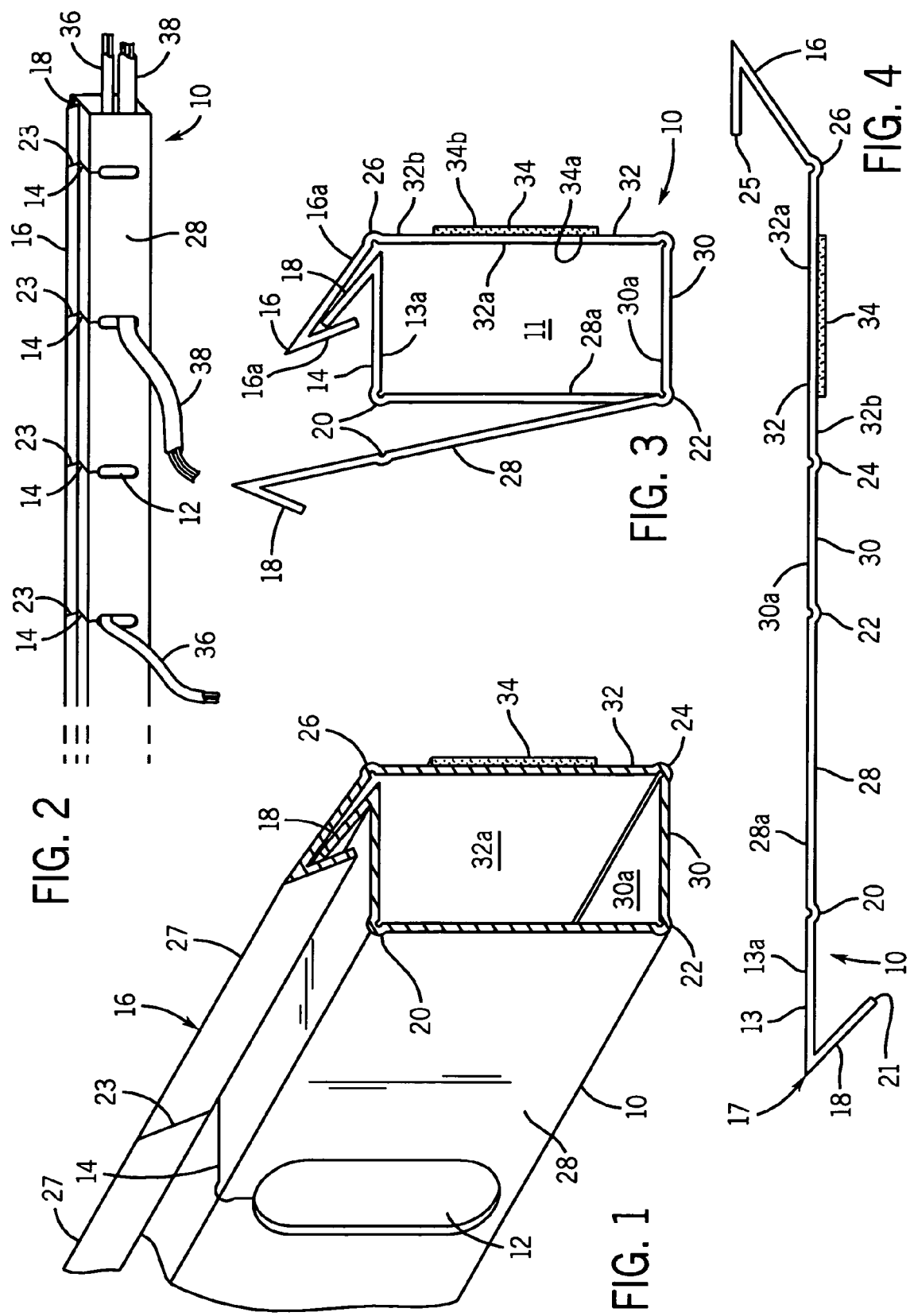

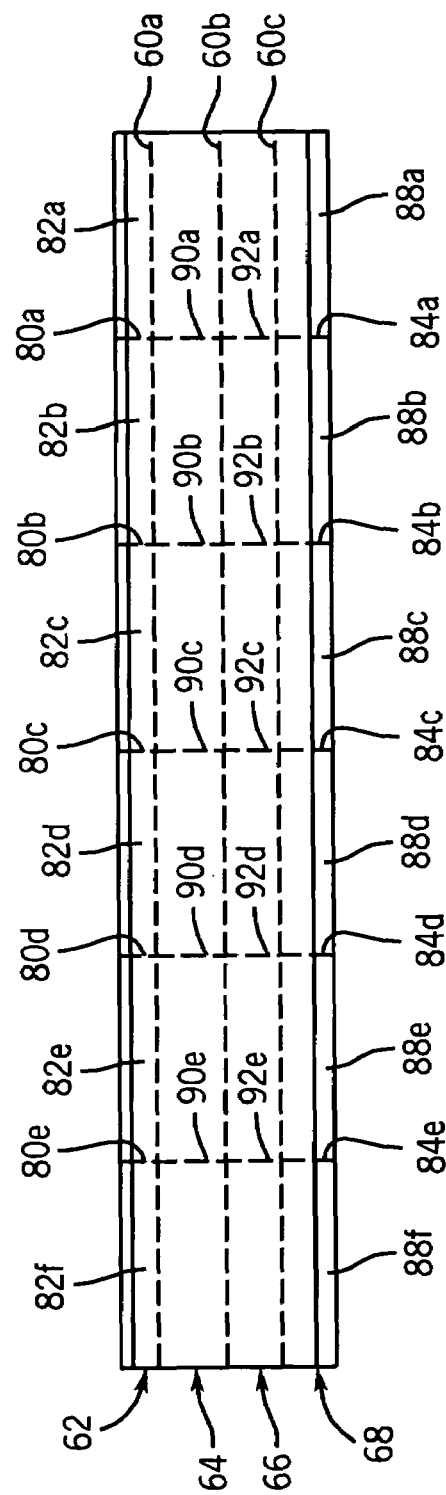
FIG. 9
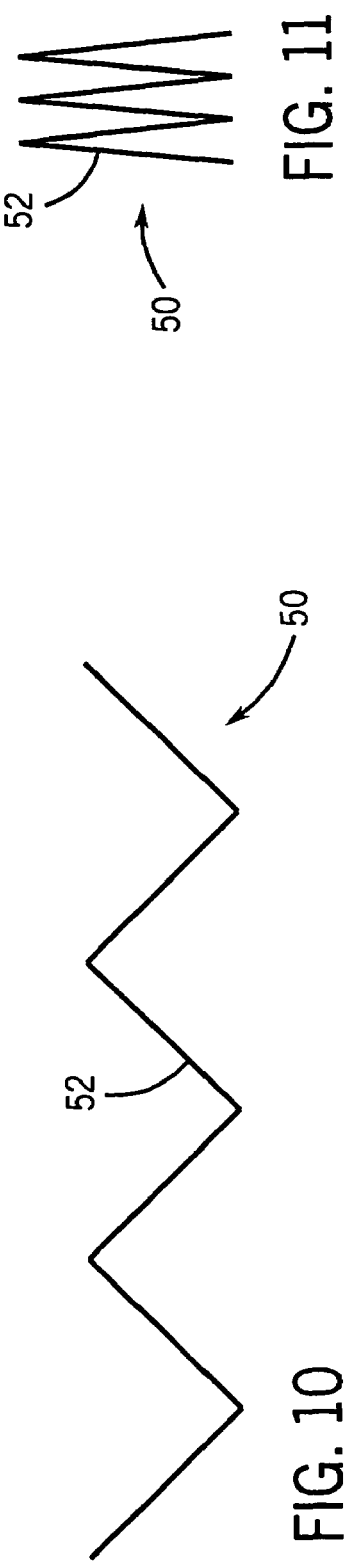
FIG. 10
FIG. 11

FLEXIBLE CONDUIT

CROSS-REFERENCE TO RELATED APPLICATIONS

This application claims the benefit of U.S. Provisional Application Ser. No. 60/564,093, filed Apr. 21, 2004.

FIELD OF THE INVENTION

This invention relates generally to flexible conduits, and in particular, to a raceway for protecting and concealing wires and cables.

BACKGROUND AND SUMMARY OF THE INVENTION

Raceways are often used to protect and conceal wires and cabling in classrooms, businesses and the like. By utilizing raceways, wiring and cables may be installed and/or removed by a contractor without the contractor having to open existing walls. Since building spaces are often changed from one use to another within a very short period of time, it can be appreciated that the use of raceways in new construction provides significant flexibility to the occupant of the space.

Heretofore, these prior raceways have been specially formed as hollow tubes of predetermined lengths. Alternatively, raceways have been developed that may be opened and closed along the entire length thereof to facilitate the insertion and/or removal of wires and cables. However, these raceways usually require special tools to open and close the raceways. This, in turn, increases the overall cost of the raceways, as well as, the time associated with installing the wiring and cables.

Various efforts have been made to overcome the limitations of prior raceways. By way of example, Katz, U.S. Pat. No. 5,814,767 discloses a single extended strip that is folded to form a raceway. The strip includes a plurality of longitudinally extending fold lines preformed therein such that the strip may be folded to form the sides, top and bottom of the raceway. Adhesive strips are used to secure the raceway closed and to affix the formed raceway to a selected wall or surface. While functional for its intended purpose, the raceway disclosed in the '767 patent is limited due to the use of an adhesive strip to maintain the raceway in a closed configuration. As is known, adhesive strips quickly loose their adhesive properties with the repeated opening and closing of the raceway. Consequently, it is highly desirable to provide a raceway having greater durability.

Therefore, it is a primary object and feature of the present invention to provide a raceway that may be formed from a single length of material.

It is a still further object and feature of the present invention to provide a raceway that may be repeatedly opened and closed.

It is a still further object and feature of the present invention to provide a raceway that is inexpensive to manufacture and simple to utilize.

In accordance with the present invention, a flexible conduit is provided for forming a raceway for cables and wires. The conduit includes a generally flat strip extending along an axis and including a first plurality of hinges generally parallel to the axis. The strip is foldable along the first plurality of hinges between a first open configuration and a second closed configuration wherein the strip defines the raceway. A locking structure releasably maintains the strip of material in the closed configuration.

The strip may also include a second plurality of hinges spaced along the axis. Each hinge of the second plurality of hinges extends along a corresponding hinge axis generally perpendicular to the axis of the strip. The strip includes a first latching portion; a backing portion; a bottom portion; and a second latching portion. The first plurality of hinges includes a first hinge interconnecting the first latching portion and the backing portion of the strip; a second hinge for interconnecting the backing portion and the bottom portion of the strip; and a third hinge for interconnecting the bottom portion and the second latching portion of the strip.

The first latching portion of the strip has a first edge interconnected to the first hinge and a second, hooked edge. The second latching portion of the strip has a first edge interconnected to the third hinge and a second, hooked edge. The hooked edge of the first latching portion and the hooked edge of the second latching portion form a mating relationship with the strip in the closed configuration.

The first latching portion of the strip includes a plurality of axially spaced slits therein. Each slit in the first latching portion is transverse to the axis of the strip. The second latching portion of the strip includes a plurality of axially spaced slits therein. Each slit in the second latching portion is transverse to the axis of the strip. A second plurality of hinges is spaced along the axis of the strip. Each hinge of the second plurality of hinges extends along the back portion and the bottom portion of strip and is transverse to the axis of the strip with the strip in the open configuration. Each slit in the first latching portion of the strip is coaxial with a corresponding hinge of the second plurality of hinges and with a corresponding slit of the plurality of slits in the second latching portion with the strip in the open configuration. It is also contemplated for the second latching portion to include a generally flat face disposed between the first and second edges thereof. The flat face includes a plurality of axially spaced apertures therethough for allowing access into and out of the raceway.

In accordance with a further aspect of the present invention, a flexible conduit that forms a raceway for cables and wires is provided. The flexible conduit includes a generally flat strip extending along an axis and a first plurality of hinges in the strip. Each of the first plurality of hinges is generally parallel to the axis such that the strip is foldable along the first plurality of hinges between a first open configuration and a second closed configuration wherein the strip of material defines the raceway. A second plurality of hinges, spaced along the axis, is also provided in the strip. Each hinge of the second plurality of hinges extends along a corresponding hinge axis generally perpendicular to the axis of the strip such that the strip is foldable along the second plurality of hinges between the first open configuration and a second folded configuration. The flexible conduit may also include a locking structure for releasably maintaining the strip in the closed configuration.

The flat strip includes a first latching portion, a backing portion, a bottom portion and a second latching portion. The first plurality of hinges includes a first hinge interconnecting the first latching portion and the backing portion of the strip; a second hinge for interconnecting the backing portion and the bottom portion of the strip; and a third hinge for interconnecting the bottom portion and the second latching portion of the strip. The first latching portion of the strip has a first edge interconnected to the first hinge and a second, hooked edge. The second latching portion of the strip has a first edge interconnected to the third hinge and a second, hooked edge. The hooked edge of the first latching portion and the hooked edge of the second latching portion form a mating relationship with the strip in the closed configuration.

The first latching portion of the strip includes a plurality of axially spaced slits therein. Each slit in the first latching portion is transverse to the axis of the strip. The second latching portion of the strip includes a plurality of axially spaced slits therein. Each slit in the second latching portion is transverse to the axis of the strip. A second plurality of hinges is spaced along the axis of the strip. Each hinge of the second plurality of hinges extends along the back portion and the bottom portion of strip and is transverse to the axis of the strip with the strip in the open configuration. Each slit in the first latching portion of the strip is coaxial with a corresponding hinge of the second plurality of hinges and with a corresponding slit of the plurality of slits in the second latching portion with the strip in the open configuration. It is also contemplated for the second latching portion to include a generally flat face disposed between the first and second edges thereof. The flat face includes a plurality of axially spaced apertures therethough for allowing access into and out of the raceway.

In accordance with a still further aspect of the present invention, a flexible conduit that forms a raceway for cables and wires is provided. The flexible conduit includes a generally flat strip extending along an axis. The strip includes a first latching portion, a backing portion, a bottom portion and a second latching portion. A first hinge interconnects the first latching portion and the backing portion of the strip. A second hinge interconnects the backing portion and the bottom portion of the strip. A third hinge interconnects the bottom portion and the second latching portion of the strip. A plurality of spaced, folding hinges are also provided in the strip. Each hinge of the plurality of folding hinges extends along a corresponding hinge axis generally perpendicular to the axis of the strip such that the strip is foldable along the plurality of folding hinges between the first open configuration and a second folded configuration. The first latching portion has a first edge interconnected to the first hinge and a second, hooked edge. The second latching portion has a first edge interconnected to the third hinge and a second, hooked edge. The strip is foldable along the first, second and third hinges between a first open configuration and a second closed configuration wherein the strip of material defines the raceway. The hooked edge of the first latching portion and the hooked edge of the second latching portion form a mating relationship with the strip in the closed configuration.

The first latching portion includes a plurality of axially spaced slits therein. Each slit in the first latching portion is transverse to the axis of the strip. The second latching portion also includes a plurality of axially spaced slits therein. Each slit in the second latching portion is transverse to the axis of the strip. The plurality of folding hinges spaced along the axis extend along the back portion and the bottom portion of the strip. Each of the plurality of folding hinges is transverse to the axis of the strip with the strip in the open configuration. The second latching portion includes a generally flat face disposed between the first and second edges thereof. The flat face including a plurality of axially spaced apertures therethough for allowing access into and out of the raceway.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is an isometric view, partially in section, showing a raceway in accordance with the present invention;

FIG. 2 is a side elevational view of a raceway in accordance with the present invention;

FIG. 3 is an end view showing assembly of a raceway in accordance with the present invention;

FIG. 4 is an end view of the raceway of the present invention in an open configuration;

FIG. 9 is a top plan view of the second embodiment of the raceway of the present invention in an unfolded configuration;

FIG. 10 is a schematic, side elevational view of the second embodiment of the raceway of the present invention in a partially folded configuration; and FIG. 11 is a schematic, side elevational view of the second embodiment of the raceway of the present invention in a folded configuration.

DETAILED DESCRIPTION OF THE DRAWINGS

Figure 5:
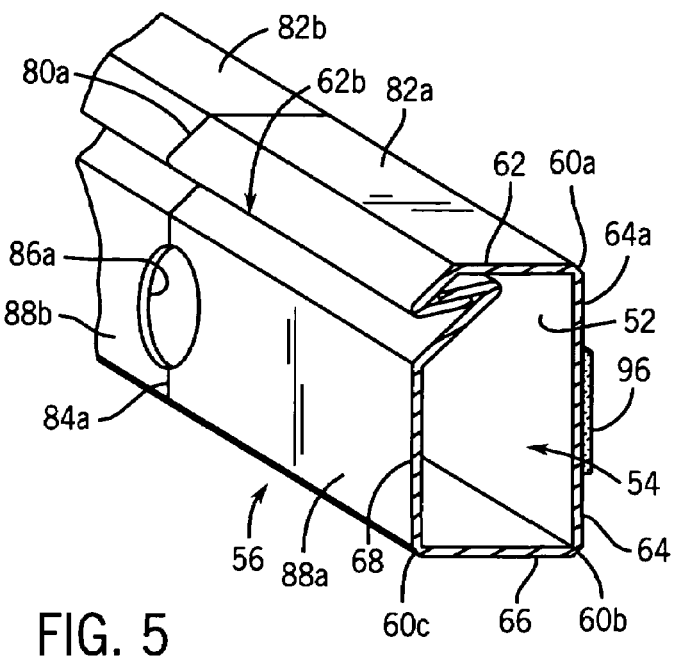
FIG. 5 is an isometric view, partially in section, showing a portion of a second embodiment of the raceway in accordance with the present invention.
Figure 8:
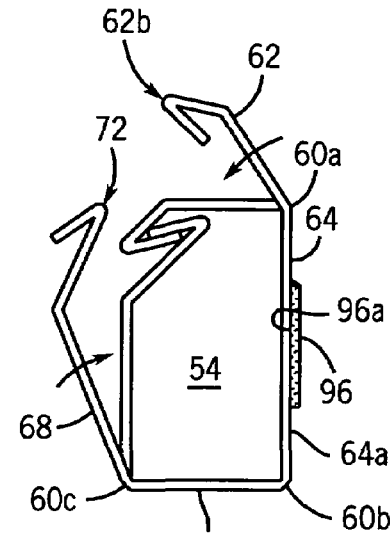
FIG. 8 is an end view of the second embodiment of the raceway of the present invention in a closed configuration.

Referring to FIGS. 1–4, a flexible conduit in accordance with the present invention is generally designated by the reference numeral 10. As hereinafter described, conduit 10 is foldable between a first open position, FIG. 4, and a second closed position, FIGS. 1–3, wherein conduit 10 defines a passageway 11 for receiving items such as wire 36 or cable 38 therethrough.

Conduit 10 extends along a longitudinal axis and includes a plurality of fold lines or hinges therein. Hinge 20 extends along the entire length of conduit 10 and interconnects top panel 13 and side panel 28. Hinge 22 is generally parallel to hinge 20 and extends along the entire length of conduit 10. Hinge 22 interconnects side panel 28 and bottom panel 30. Hinge 24 is generally parallel to hinges 20 and 22 and extends along the entire length of conduit 10. Hinge 24 interconnects bottom panel 30 and side panel 32. Hinge 26 is also generally parallel to hinges 20, 22 and 24 and extends along the entire length of conduit 10. Hinge 26 interconnects side panel 32 and outer hook latch 16. Outer hook latch 16 is defined by first and second legs 16a and 16b, respectively, and is adapted for receiving inner hook latch 18 that projects from side 17 of top panel 13.

In order to form a raceway from flexible conduit 10, FIGS. 1–3, flexible conduit 10 is folded along hinges 20, 22, 24 and 26 such that flexible conduit 10 has a generally rectangular cross-section. In its folded configuration, inner surface 13a of top panel 13, inner surface 28a of side panel 28, inner surface 30a of bottom panel 30 and inner surface 32a of side panel 32 define passageway 11 through flexible conduit 10. In order to maintain flexible conduit 10 in its folded configuration, outer hook latch 16 is fold over inner hook latch 18, FIGS. 1 and 3, so as to capture inner hook latch 18 between first and second legs 16a and 16b, respectively, of outer hook latch 16.

In order to affix flexible conduit 10 to a wall or surface, double sided adhesive 34 is provided. By way of example, first side 34a of double sided adhesive 34 is affixed to outer surface 32b of side panel 32. Second side 34b of adhesive 34 may be affixed to a desired wall or surface. It can be appreciated that adhesive 34 may be affixed to other portions of flexible conduit 10 such as bottom panel 30 or side panel 28 without deviating from the scope of the present invention.

As best seen in FIGS. 1 and 2, side panel 28 may include a plurality of axially spaced apertures 12 therein. Apertures 12 allow wire 36 and cable 38 to pass between passageway 11 and the exterior of the flexible conduit 10 thereby allowing wire 36 and cable 38 to be directed to a desired location. In addition, it is contemplated to provide axially spaced slits 14 in flexible conduit 10 between apertures 12 and edge 21 thereof. In addition, it is contemplated to provide axially spaced slits 23 in outer hook latch 16 between hinge 26 and edge 25 of flexible conduit 10. Each slit 23 in outer hook latch 16 lies in a common plane with a corresponding slit 14 in flexible conduit 10. As a result, outer hook latch 16 is divided into a plurality of segments 27 which may be individually disconnected from corresponding segments of inner hook latch 16 to allow a user to partially unfold a desired portion of flexible conduit 10 to allow access to passageway 11. This, in turn, facilitates the installation and/or removal of wires 36 and cables 38 from selected portions of passageway 11 through flexible conduit 10.

Referring to FIGS. 5–11, an alternate embodiment of a flexible conduit in accordance with the present invention is generally designated by the reference numeral 50. As hereinafter described, conduit 50 is formed from a strip of material 52 that is foldable between an open configuration, FIGS. 8 and 10, and a closed configuration, FIGS. 5–6, wherein conduit 50 defines passageway 54 for receiving items such as wire 56 and/or cable 58 therethrough.

Conduit 50 extends along a longitudinal axis and includes a first plurality of fold lines 60a, 60b, and 60c therein that are generally parallel to the longitudinal axis of conduit 10. Hinge 60a extends along the entire length of strip 52 and interconnects a top panel 62 and side panel 64. Hinge 60b interconnects side panel 64 and bottom panel 66. Hinge 60c extends along the entire line of strip 52 and interconnects front panel 68 and bottom panel 66.

Top panel 62 includes first end 62a interconnected to hinge 60a and second hooked end 62b. Hooked end 62b of top panel 62 is defined by first and second legs 64a and 64b, respectively, that are interconnected at junction 76 and diverge therefrom. Side panel 64 and bottom panel 66 of strip 52 are generally rectangular in shape. Front panel 68 includes front face portion 70 having first edge 70a interconnected to hinge 60c and second opposite edge 70b. Hook portion 72 of front panel 68 extends from second edge 70b of front face portion 70 and is defined by first and second legs 74a and 74b, respectively. First and second legs 74a and 74b, respectively, of hooked portion 72 of front panel 68 are interconnected at and diverge from junction 76. Terminal end of second leg 74b of hooked portion 72 is rigidly connected to second edge 70b of front face portion 70 of front panel 68. It can be appreciated that first leg 74a of hooked portion 72 of front panel 68 is adapted for receipt between first and second legs 64a and 64b of hooked end 62b of top panel 62, as hereinafter described, in order to maintain conduit 50 in its closed configuration, FIGS. 5–6 and 9.

Top panel 62 includes a plurality of axially spaced slits 80a–80d that are perpendicular to hinge 60a and to the longitudinal axis of flexible conduit 50. Slits 80a–80e in top panel 62 divide top panel 62 into a plurality of corresponding sections 82a–82f. Similarly, front panel 68 includes a plurality of axially spaced slits 84a–84e that extend between first edge 70a of front face portion 70 and the terminal end of first leg 74a of hook portion 72. Slits 84a–84e in front panel 68 are generally perpendicular to hinge 60c and to the longitudinal axis of conduit 50. In addition, slits 84a–84e bisect corresponding axially spaced knockouts 85a–85b provided in front face portion 70 of front panel 68. Knockouts 85a–85b may be removed to provide apertures 86a–86d, respectively, extending through front face portion 70 of front panel 68 so as to allow access to passageway 54 through conduit 50 for wire 56 and/or cable 58. Slits 84a–84e separate front panel 68 into corresponding sections 88a–88f. It can be appreciated that slits 80a–80e in top panel 62 and slits 84a–84e in front panel 68 lie in common corresponding planes with conduit 50 in its closed configuration, FIGS. 5–6. With flexible conduit 50 in its open configuration, FIGS. 7 and 10, slits 80a–80e in top panel 62 are generally co-axial with corresponding slits 84a–84e, respectively, in front panel 68.

As best seen in FIG. 9, side panel 64 includes a plurality of generally parallel axially spaced hinges 90a–90e that extends along the entire width of side panel 64. Hinges 90a–90e in side panel 64 are generally perpendicular to and extend between hinges 60a and 60b. In addition, hinges 90a–90e and are generally perpendicular to the longitudinal axis of flexible conduit 50. Hinges 90a–90e lie in common planes with corresponding hinges 92a–92e, respectively. With flexible conduit 50 in its open configuration, FIGS. 7 and 9, hinges 90a–90e in side panel 64 are axially aligned with corresponding hinges 92a–92e, respectively, in bottom panel 66. With flexible conduit 50 in its closed configuration, FIGS. 5–6, hinges 90a–90e in side panel 64 are generally perpendicular hinges 92a–92e in bottom panel 66. It can be appreciated that with flexible conduit 50 in its open configuration, strip 52 may be folded, as depicted in FIG. 10, along co-axial pairs of hinges in side panel 64 and bottom panel 66, FIG. 10, such that the strip of material 52 may be folded onto itself, FIG. 11, for packaging and transport.

Figure 7:
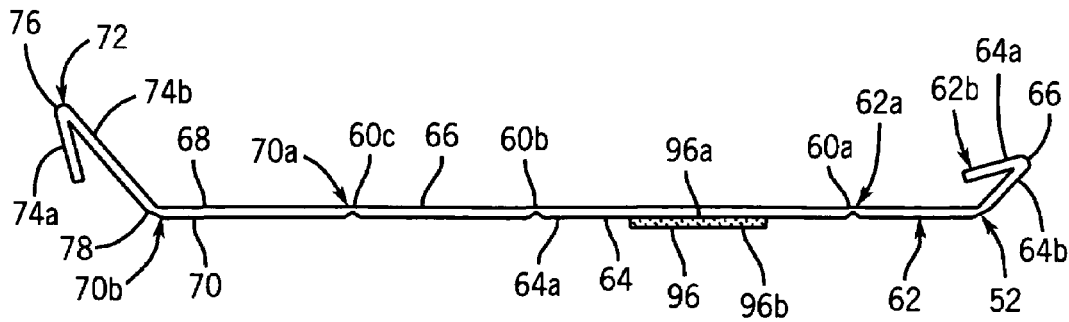
FIG. 7 is an end view showing the second embodiment of the raceway of the present invention in an open configuration.

In operation, flexible conduit 50 is unfolded from its folded configuration, FIG. 11, to its open configuration, FIGS. 7 and 9. First side 96a of double sided adhesive 96 is affixed to outer surface 64a of side panel 64. Second side 96b of double sided adhesive 96 may be used for mounting flexible conduit 50 to a desired wall or surface. It can be appreciated that adhesive 96 may be affixed to other portions of flexible conduit 50 such as bottom panel 66 without deviating from the scope of the present invention.

Figure 6:
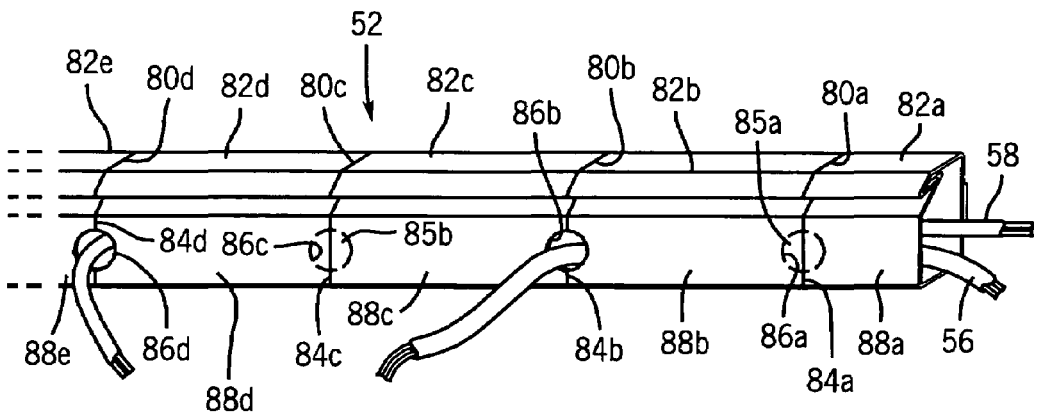
FIG. 6 is a side elevational view of a portion of a second embodiment of the raceway of the present invention.

Once affixed to a desired wall or surface, flexible conduit 50 may be folded along its hinges 60a–60c to its closed configuration, FIGS. 5–6. Thereafter, wires 56 and/or cables 58 may be routed through passageway 54 through conduit 50 and routed out of a desired aperture 86a–86d in front face portion 70 of front panel 68 at a desired location. It can be appreciated that by providing slits 80a–80e in top panel 62 and slits 84a–84e in front panel 68, a user may open a desired section 82a–82f in top panel 62 and a corresponding section 88a–88f in front panel 68 to allow easy access to passageway 54 through flexible conduit 50 and facilitate the routing of wires 56 and/or cables 58 therethrough.

Various modes of carrying out the invention are contemplated as being within the scope of the following claims particularly pointing out and distinctly claiming the subject matter which is regarded as the invention.

We claim:

1. A flexible conduit for forming a raceway for cables and wires, comprising:
   a generally flat strip of material extending along an axis and including:
      a first plurality of hinges generally parallel to the axis, the strip of material foldable a along the first plurality of hinges between a first open configuration and a second closed configuration wherein the strip of material defines the raceway; and
      a second plurality of hinges spaced along the axis, each hinge of the second plurality of hinges extending about a corresponding hinge axis generally perpendicular to the axis of the strip; and
   a locking structure for releasably maintaining the strip of material in the closed configuration.

2. The flexible conduit of claim 1 wherein the strip includes:
   a first latching portion;
   a backing portion;
   a bottom portion; and
   a second latching portion.

3. A flexible conduit for forming a raceway for cables and wires, comprising:
   a generally flat strip of material extending along an axis and including a first plurality of hinges generally parallel to the axis, the strip of material foldable along the first plurality of hinges between a first open configuration and a second closed configuration wherein the strip of material defines the raceway; and
   a locking structure for releasably maintaining the strip of material in the closed configuration;
   wherein:
      the strip includes:
         a first latching portion;
         a backing portion;
         a bottom portion; and
         a second latching portion;
      the first plurality of hinges includes:
         a first hinge interconnecting the first latching portion and the backing portion of the strip;
         a second hinge for interconnecting the backing portion and the bottom portion of the strip; and
         a third hinge for interconnecting the bottom portion and the second latching portion of the strip; and
      the first latching portion includes a plurality of axially spaced slits therein, each slit being transverse to the axis of the strip.

4. The flexible conduit of claim 3 wherein the second latching portion includes a plurality of axially spaced slits therein, each slit being transverse to the axis of the strip.

5. The flexible conduit of claim 4 wherein the strip includes a second plurality of hinges spaced along the axis, each hinge of the second plurality of hinges extending along the back portion and the bottom portion of strip and being transverse to the axis of the strip with the strip in the open configuration.

6. The flexible conduit of claim 5 wherein each slit in the first latching portion of the strip is coaxial with a corresponding hinge of the second plurality of hinges and with a corresponding slit of the plurality of slits in the second latching portion with the strip in the open configuration.

7. The flexible conduit of claim 3 wherein the second latching portion includes a generally flat face disposed between the first and second edges thereof, the flat face including a plurality of axially spaced apertures therethough for allowing access into and out of the raceway.

8. A flexible conduit that forms a raceway for cables and wires, comprising:
   a generally flat strip extending along an axis;
   a first plurality of hinges in the strip, each of the first plurality of hinges being generally parallel to the axis such that the strip is foldable along the first plurality of hinges between a first open configuration and a second closed configuration wherein the strip of material defines the raceway; and
   a second plurality of hinges in the strip and being paced along the axis, each hinge of the second plurality of hinges extending along a corresponding hinge axis generally perpendicular to the axis of the strip such that the strip is foldable along the second plurality of hinges between the first open configuration and a second folded configuration.

9. The flexible conduit of claim 8 further comprising a locking structure for releasably maintaining the strip in the closed configuration.

10. The flexible conduit of claim 8 wherein the flat strip includes a first latching portion, a backing portion, a bottom portion and a second latching portion and wherein the first plurality of hinges includes:
    a first hinge interconnecting the first latching portion and the backing portion of the strip;
    a second hinge for interconnecting the backing portion and the bottom portion of the strip; and
    a third hinge for interconnecting the bottom portion and the second latching portion of the strip.

11. The flexible conduit of claim 10 wherein the first latching portion has a first edge interconnected to the first hinge and a second, hooked edge and wherein the second latching portion has a first edge interconnected to the third hinge and a second, hooked edge such that the hooked edge of the first latching portion and the hooked edge of the second latching portion form a mating relationship with the strip in the closed configuration.

12. The flexible conduit of claim 11 wherein the first latching portion includes a plurality of axially spaced slits therein, each slit being transverse to the axis of the strip.

13. The flexible conduit of claim 12 wherein the second latching portion includes a plurality of axially spaced slits therein, each slit being transverse to the axis of the strip.

14. The flexible conduit of claim 13 wherein the second plurality of hinges spaced along the axis extend along the back portion and the bottom portion of the strip and wherein each of the second plurality of hinges is transverse to the axis of the strip with the strip in the open configuration.

15. The flexible conduit of claim 10 wherein the second latching portion includes a generally flat face disposed between the first and second edges thereof, the flat face including a plurality of axially spaced apertures therethough for allowing access into and out of the raceway.

16. A flexible conduit that forms a raceway for cables and wires, comprising:
    a generally flat strip extending along an axis, the strip includes a first latching portion, a backing portion, a bottom portion and a second latching portion;
    a first hinge interconnecting the first latching portion and the backing portion of the strip;
    a second hinge for interconnecting the backing portion and the bottom portion of the strip;

a third hinge for interconnecting the bottom portion and the second latching portion of the strip;

a plurality of spaced, folding hinges in the strip, each hinge of the plurality of folding hinges extending along a corresponding hinge axis generally perpendicular to the axis of the strip such that the strip is foldable along the plurality of folding hinges between the first open configuration and a second folded configuration;

wherein:

the first latching portion has a first edge interconnected to the first hinge and a second, hooked edge;

the second latching portion has a first edge interconnected to the third hinge and a second, hooked edge;

the strip is foldable along the first, second and third hinges between a first open configuration and a second closed configuration wherein the strip of material defines the raceway; and the hooked edge of the first latching portion and the hooked edge of the second latching portion form a mating relationship with the strip in the closed configuration.

17. The flexible conduit of claim 16 wherein the first latching portion includes a plurality of axially spaced slits therein, each slit being transverse to the axis of the strip.

18. The flexible conduit of claim 17 wherein the second latching portion includes a plurality of axially spaced slits therein, each slit being transverse to the axis of the strip.

19. The flexible conduit of claim 18 wherein the plurality of folding hinges spaced along the axis extend along the back portion and the bottom portion of the strip and wherein each of the plurality of folding hinges is transverse to the axis of the strip with the strip in the open configuration.

20. The flexible conduit of claim 16 wherein the second latching portion includes a generally flat face disposed between the first and second edges thereof the flat face including a plurality of axially spaced apertures therethough for allowing access into and out of the raceway.

21. A flexible conduit for forming a raceway for cables and wires, comprising:

a generally flat strip of material extending along an axis and including a first plurality of hinges generally parallel to the axis, the strip of material foldable along the first plurality of hinges between a first open configuration and a second closed configuration wherein the strip of material defines the raceway; and a locking structure for releasably maintaining the strip of material in the closed configuration;

wherein:

the strip includes:
a first latching portion;
a backing portion;
a bottom portion; and
a second latching portion;

the first plurality of hinges includes:
a first hinge interconnecting the first latching portion and the backing portion of the strip;
a second hinge for interconnecting the backing portion and the bottom portion of the strip; and
a third hinge for interconnecting the bottom portion and the second latching portion of the strip; and the first latching portion has a first edge interconnected to the first hinge and a second, hooked edge and wherein the second latching portion has a first edge interconnected to the third hinge and a second, hooked edge such that the hooked edge of the first latching portion and the hooked edge of the second latching portion form a mating relationship with the strip in the closed configuration.

* * * * *